(12) United States Patent
Thomas

(10) Patent No.: US 7,780,192 B2
(45) Date of Patent: Aug. 24, 2010

(54) AIR BAG SYSTEM

(75) Inventor: Scott D. Thomas, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 857 days.

(21) Appl. No.: 11/411,405

(22) Filed: Apr. 26, 2006

(65) Prior Publication Data

US 2007/0252369 A1 Nov. 1, 2007

(51) Int. Cl.
*B60R 21/276* (2006.01)
(52) U.S. Cl. .......................... 280/739; 280/742
(58) Field of Classification Search .............. 280/739, 280/736, 742
See application file for complete search history.

(56) References Cited

U.S. PATENT DOCUMENTS

| | | | | |
|---|---|---|---|---|
| 6,406,055 B1 * | 6/2002 | Faigle et al. | ............. | 280/728.2 |
| 6,799,777 B2 * | 10/2004 | Hawthorn et al. | ............ | 280/742 |
| 7,055,857 B2 * | 6/2006 | Marotzke | .................... | 280/736 |

* cited by examiner

*Primary Examiner*—Eric Culbreth
(74) *Attorney, Agent, or Firm*—Quinn Law Group, PLLC

(57) ABSTRACT

An air bag system includes an inflator operable to release inflation fluid, an inflatable cushion inflatable upon release of inflation fluid from the inflator, an air bag housing substantially surrounding the cushion, and an internal valve in fluid communication with the inflator. The internal valve includes at least one fluid diverter movable between a first position and a second position. As the fluid diverter moves from the first position to the second position, fluid flow into the cushion decreases and fluid flow through the vent increases.

20 Claims, 4 Drawing Sheets

AIR BAG SYSTEM

TECHNICAL FIELD

This invention relates to an automotive vehicle air bag system, and more particularly to a movable member for assisting in controlling deployment of an air bag.

BACKGROUND OF THE INVENTION

Air bag systems in automotive vehicles generally include an air bag that is designed to deploy within a passenger compartment of the automotive vehicle when triggered by a sensor signal. For example, air bag systems might be deployed upon sudden deceleration of a vehicle or upon impact of the vehicle with another object. The art continues to investigate alternative ways to deploy air bags. For example, accelerometers have been investigated to determine when a sensor signal should signal the deployment of an air bag. Inflator assemblies have been developed to control how much gas is emitted into an air bag upon deployment.

SUMMARY OF THE INVENTION

An air bag system includes an inflator operable to release inflation fluid, an inflatable cushion inflatable upon release of inflation fluid from the inflator, an air bag housing substantially surrounding the cushion, and an internal valve in fluid communication with the inflator. The internal valve includes at least one fluid diverter movable between a first position and a second position. As the fluid diverter moves from the first position to the second position, fluid flow into the cushion decreases and fluid flow through the vent increases. Preferably, inflation fluid moves the fluid diverter between the first and second positions. If the vent is blocked, fluid is preferably forced past the fluid diverter into the cushion.

The internal valve may include a valve plate, with the fluid diverter hingedly attached to the valve plate for movement between the first and second positions. A deformable extension may be included to slow down movement from the first position to the second position. In one aspect of the invention, the fluid diverter is a coil rolled upon itself when in the first position, with the fluid diverter unrolling to move from the first position to the second position. In another aspect of the invention, the fluid diverter is accordion shaped, and compresses to move from the first position to the second position. In yet another aspect of the present invention, the fluid diverter is a vaned spool translatable along a threaded shaft to move between the first and second positions.

The air bag system may further include a retention member movable from a locking position to an unlocking position, with the retention member preventing movement of the fluid diverter when in the locking position. The air bag system may include a deployment door, with a tether extending between the retention member and the deployment door pulling the retention member from the locking position to the unlocking position when the deployment door opens. The retention member may attach to the cushion, with inflation of the cushion beyond a predetermined distance pulling the retention member from the locking position to the unlocking position. The fluid diverter may be operable to move the retention member from the locking position to the unlocking position. The retention member may attach to the internal valve at at least one location, with the retention member bending with respect to the internal valve at the location to move from the locking position to the unlocking position.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1A:
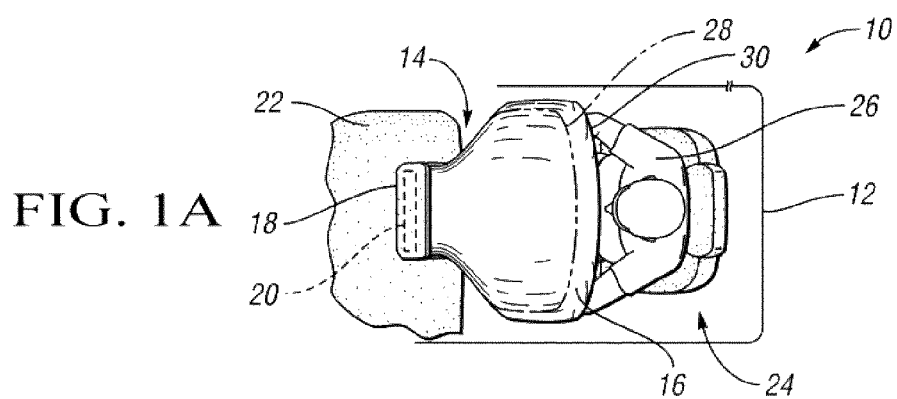
FIG. 1A is a schematic plan view of an air bag system mounted to a vehicle.
Figure 1B:
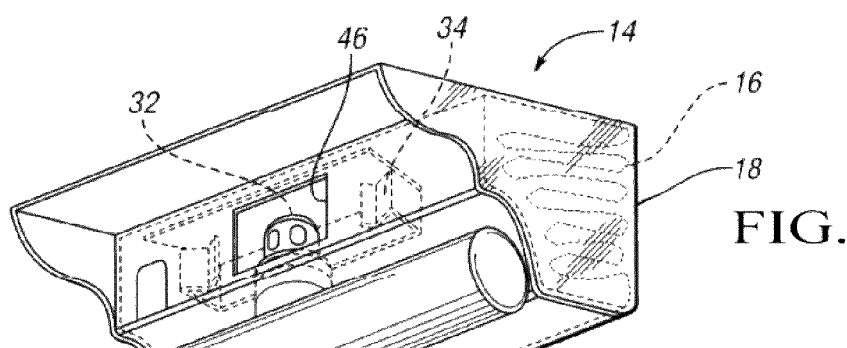
FIG. 1B is a schematic perspective view of a portion of the air bag system of FIG. 1A showing an internal valve according to the present invention.

Referring to the drawings, wherein like reference numbers refer to like components, FIG. 1A shows a vehicle 10 having a vehicle body 12. An air bag system 14 is mounted to the vehicle 10. The air bag system includes an inflatable cushion 16 connected to an air bag housing 18. An inflator 20 is mounted within the housing 18. The housing 18 is mounted within an instrument panel 22, although it may be mounted elsewhere on the vehicle 10 within the scope of the invention. The cushion 16 is selectively deployable into an interior space 24 toward an occupant 26 upon release of inflation gas by the inflator 20. The cushion 16 may be inflatable when deployed to either a shallow first profile 28 or a deeper second profile 30 as known in the art. Sensors (not shown) mounted to the vehicle 10 may be connected in signaling communication with the inflator 20, as known to those skilled in the art. Under certain sensed conditions, the sensors signal the inflator 20 to release inflation fluid, thereby inflating the cushion 16. FIG. 1B shows the air bag system 14 of FIG. 1A in greater detail. Specifically, the inflator 20 includes a nozzle 32 extending toward an internal valve 34 according to the present invention. While the nozzle 32 is shown extending from a top of the inflator 20, it should be appreciated that the nozzle 32 can extend from an end of the inflator 20, be positioned radially around a body of the inflator 20, or in some other manner, be oriented toward the internal valve 34.

Referring now to FIGS. 2A through 2D, a first embodiment of the internal valve 34 is shown in greater detail. The internal valve 34 includes a pair of fluid diverters 36 hingedly attached to a valve plate 38. The fluid diverters 36 are selectively movable between a first position and a second position to control inflation fluid flow from the inflator 20 of FIG. 1A into the cushion 16 of FIG. 1A. Cushion 16 is shown schematically in FIG. 1B. The fluid diverters 36, shown in the first position in FIGS. 2A and 2B, may attach to the valve plate 38 in a different manner other than as shown herein without changing the inventive concept. Additionally, the fluid diverters 36 may be integrally formed with the valve plate 38. It should also be noted that the valve plate 38 may attach to any portion of the air bag system 14 without changing the inventive concept.

Figure 2A:
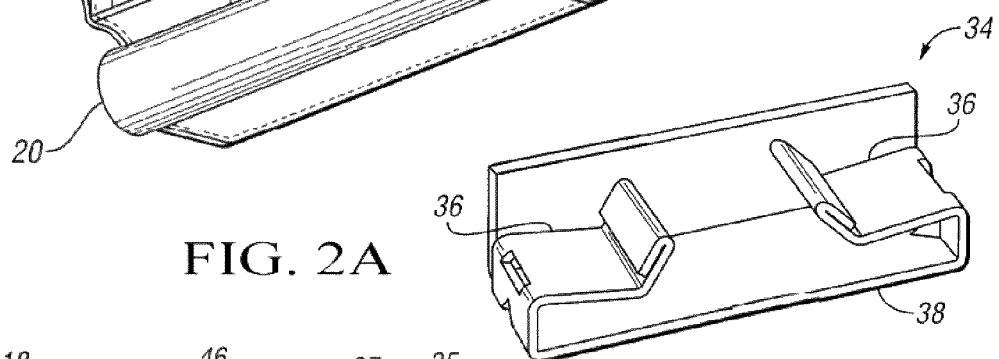
FIG. 2A is a schematic perspective view of a first embodiment of an internal valve for use within an air bag system such as that of FIG. 1A.
Figure 2B:
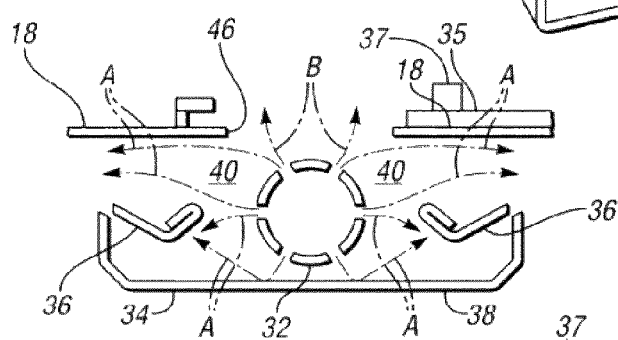
FIG. 2B is a schematic cross-sectional view of the internal valve of FIG. 2A with a pair of fluid diverters in a first position.
Figure 2C:
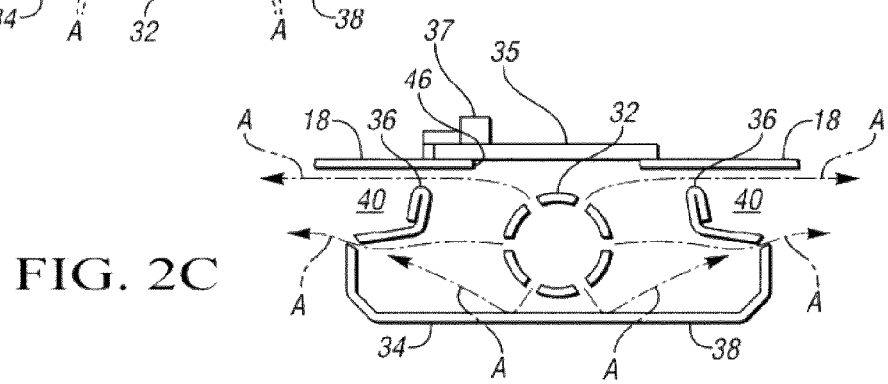
FIG. 2C is a schematic cross-sectional view of the internal valve of FIGS. 2A and 2B with the pair of fluid diverters in a second position and with the vent substantially closed.

As best seen in FIGS. 2B and 2C, the internal valve 34 defines a pair of cushion paths 40, with a cushion path 40 defined between each fluid diverter 36 and the housing 18. It should be appreciated that the cushion paths 40 could be defined between the fluid diverter 36 and any other portion of the air bag system 14 within the scope of the present invention. The cushion paths 40 are in fluid communication with the cushion 16 of FIG. 1A. The housing 18 defines a vent 46, through which inflation fluid may pass if the vent 46 is not blocked by some other portion of the air bag system 14. The fluid diverters 36 are operable to divert a first portion of inflation fluid A through the cushion paths 40 into the cushion 16 of FIG. 1A, and a second portion of inflation fluid B toward the vent 46.

Figure 2D:
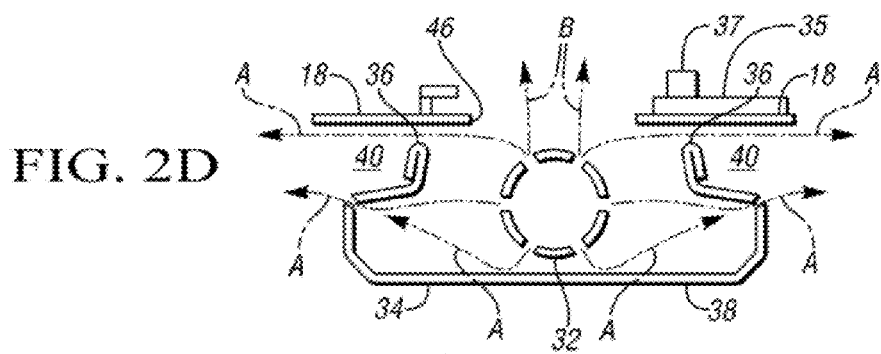
FIG. 2D is a schematic cross-sectional view of the internal valve of FIGS. 2A and 2B with the pair of fluid diverters in a second position and with the vent substantially open.

When the fluid diverters 36 are in the first position as shown in FIGS. 2A and 2B, the internal valve 34 is in an open condition. When the fluid diverters 36 are in the second position as shown in FIGS. 2C and 2D, the internal valve 34 is in a closed condition. Since the fluid diverters 36 at least partially cover the cushion paths 40 when in the second position, more fluid can pass through the cushion paths 40 when the internal valve 34 is in the open condition. Thus, if the vent 46 remains open, the first portion of fluid A is greater when the internal valve 34 is in the open condition (see FIG. 2B) than when the internal valve 34 is in the closed condition (see FIG. 2D). As the first portion of fluid A decreases, the second portion of fluid B increases; that is, less fluid escaping through the cushion paths 40 equates to more fluid escaping through the open vent 46. Thus, if the vent 46 remains open, the second portion of fluid B is greater when the internal valve 34 is in the closed condition (see FIG. 2D) than when the internal valve 34 is in the open condition (see FIG. 2B). The vent 46 may be closed in a number of different ways within the scope of the present invention. As one example, a vent blocker 35 is shown in FIGS. 2B through 2D. The vent blocker 35 is preferably movable between a first position, shown in FIG. 2B, wherein the vent 46 remains substantially open, and a second position, shown in FIG. 2C, wherein the vent blocker 35 rests atop the vent 46, thereby closing the vent 46. Preferably a stop 37 is included to prevent overtravel of the vent blocker 35 once the vent blocker 35 has reached the second position. Note that the vent blocker 35 may either block or not block the vent 46 when the internal valve 34 is open. Likewise, the vent blocker 35 may either block or not block the vent 46 when the internal valve 34 is closed, comparing FIGS. 2C and 2D.

Preferably, the internal valve 34 is initially in the open condition, with inflation fluid acting on the fluid diverters 36 to move them to the second position, thereby changing the internal valve 34 to the closed condition. The present invention further contemplates fluid diverters 36 that may return to the first position, such as when inflation fluid flow from the inflator 20 slows. For example, the fluid diverters 36 may be operably connected to springs or other such devices. It should be noted that if the vent 46 is completely blocked, as when the vent blocker 35 is in the second position as shown in FIG. 2C, the first portion of fluid that is initially directed toward the vent 46 will travel into the cushion 16 through the cushion paths 40 even if the internal valve is in the closed condition with reduced size cushion paths 40. Additionally, any blockage of the vent 46 will decrease the second portion of fluid, while increasing the first portion of fluid.

Figure 3A:
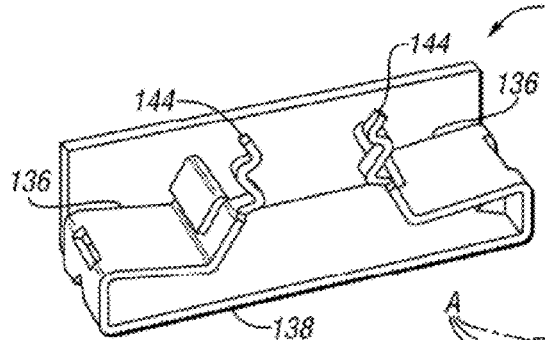
FIG. 3A is a schematic perspective view of a second embodiment of an internal valve with a pair of fluid diverters having deceleration members extending therefrom in a first position.
Figure 3B:
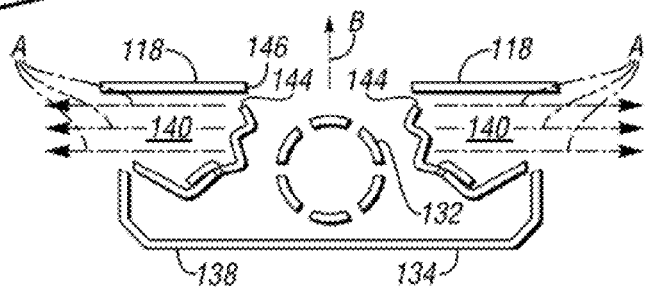
FIG. 3B is a schematic cross-sectional view of the internal valve of FIG. 3A with the fluid diverters in the first position.
Figure 3C:
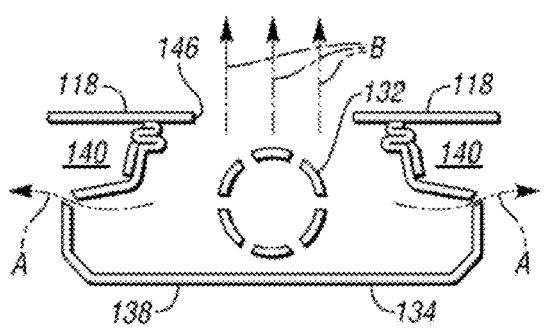
FIG. 3C is a schematic cross-sectional view of the internal valve of FIGS. 3A and 3B with the fluid diverters in a second position.

FIGS. 3A through 3C show a second embodiment of an internal valve 134 according to the present invention, with a pair of fluid diverters 136 hingedly attached to a valve plate 138. In this embodiment, each of the fluid diverters 136 includes a deceleration member 144. Particularly, one of the deceleration members 144 extends from each of the fluid diverters 136. The deceleration members 144 are preferably formed from a deformable material, such that as the fluid diverters 136 move from a first position, shown in FIGS. 3A and 3B, to a second position, shown in FIG. 3C, the deceleration members 144 deform against a housing 118, or another portion of an air bag system, thereby slowing the movement of the fluid diverters 136. The internal valve 134 defines a pair of cushion paths 140, with one cushion path 140 between each fluid diverter 136 and the housing 118. The cushion paths 140 are in fluid communication with an inflatable cushion (not shown) such as the cushion 16 of FIG. 1A. Inflation fluid exits through an inflator nozzle 132. A first portion of inflation fluid travels into the cushion through the cushion paths 140, while a second portion of fluid exits the housing 118 through an unblocked vent 146 defined thereby.

When the fluid diverters 136 are in the first position, as shown in FIG. 3B, the internal valve 134 is in an open condition. When the fluid diverters 136 are in the second position, as shown in FIG. 3C, the internal valve 134 is in a closed condition. When the internal valve 134 is in the open condition, a greater amount of inflation fluid is directed through the cushion paths 140 than when the internal valve 134 is in the closed position. When the internal valve 134 is in the closed condition, the fluid diverters 136 at least partially block the cushion paths 140, thereby allowing less inflation fluid into the cushion, and forcing more inflation fluid out of the air bag system through the vent 146 if vent 146 remains open. Note that if the vent 146 is blocked, the second portion of fluid will also travel into the cushion through the cushion paths 140 even if the internal valve 134 is in the closed position.

Figure 4A:
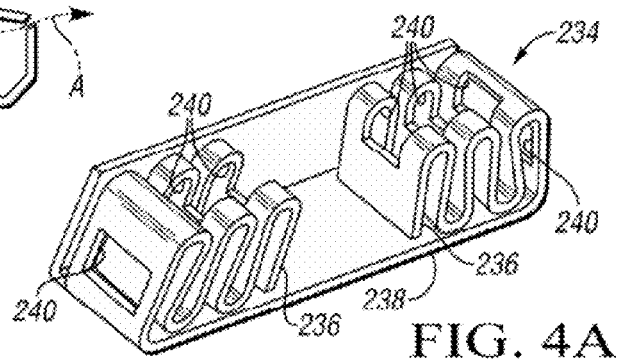
FIG. 4A is a schematic perspective view of a third embodiment of an internal valve with a pair of fluid diverters in a first position.
Figure 4B:
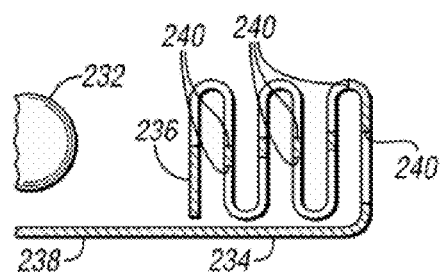
FIG. 4B is a schematic cross-sectional view of the internal valve of FIG. 4A with one of the pair of fluid diverters in the first position.
Figure 4C:
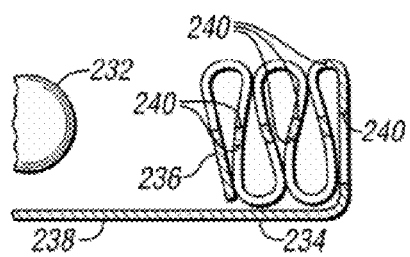
FIG. 4C is a schematic cross-sectional view of the internal valve of FIG. 4B with the fluid diverter in a second position.

FIGS. 4A through 4C show a third embodiment of an internal valve 234 according to the present invention. In this embodiment, a pair of fluid diverters 236 are integrally formed with a valve plate 238. The fluid diverters 236, shown in a first position in FIGS. 4A and 4B and in a second position in FIG. 4C, are accordion-shaped, and compress to move from the first position to the second position. The fluid diverters 236 each define a plurality of openings defining a cushion path 240, with inflation fluid traveling from an inflator nozzle 232 (shown in FIGS. 4B and 4C) through the paths 240 into a cushion (not shown) when the fluid diverters 236 are in the first position. As with previous embodiments, when the fluid diverters 236 are in the first position, the internal valve 234 is in an open condition. When the fluid diverters 236 compress to the second position, the cushion paths 240 become at least partially blocked by the fluid diverters 236 as shown in FIG. 4C, thereby changing the internal valve 234 to a closed condition. When the internal valve 234 is in the open condition, more inflation fluid is directed into the cushion through the cushion paths 240 than when the internal valve 234 is in the closed condition. Likewise, more inflation fluid is directed out of the system through a vent (not shown) within a housing (not shown) when the internal valve 234 is in the closed condition than when the internal valve 234 is in the open condition.

Figure 5A:
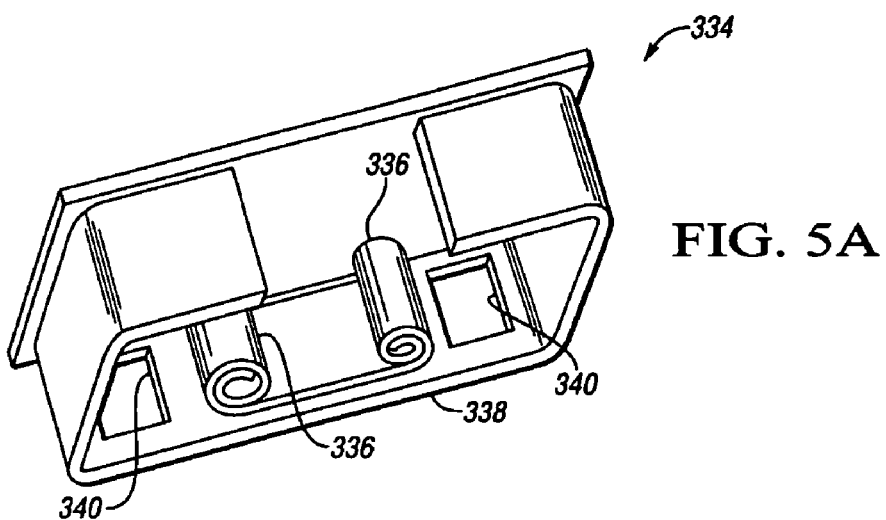
FIG. 5A is a schematic perspective view of a fourth embodiment of an internal valve with a pair of fluid diverters in a first position.
Figure 5B:
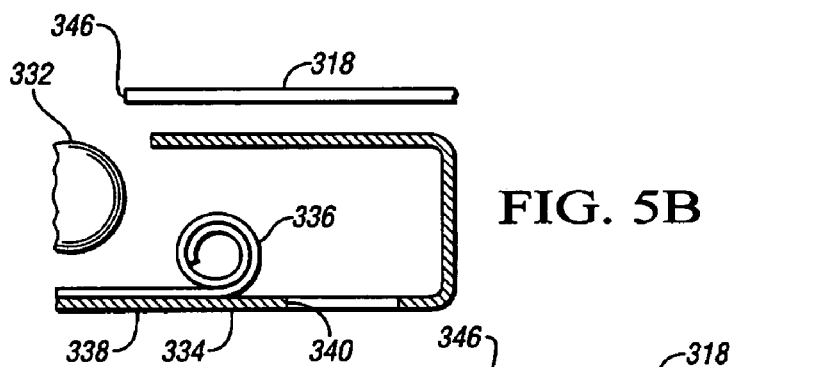
FIG. 5B is a schematic cross-sectional view of the internal valve of FIG. 5A with one of the pair of fluid diverters in the first position.
Figure 5C:
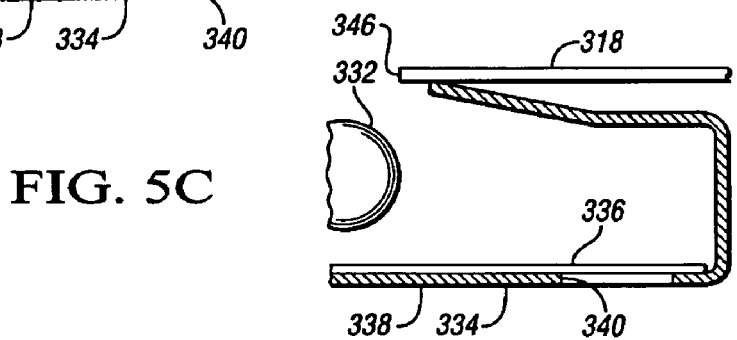
FIG. 5C is a schematic cross-sectional view of the internal valve of FIG. 5B with the fluid diverter in a second position.

FIGS. 5A through 5C show a fourth embodiment of an internal valve 334, wherein a pair of fluid diverters 336 are formed integrally with one another and attached to a valve plate 338. The valve plate 338 defines cushion paths 340 in fluid communication with the inflatable cushion 16 of FIG. 1A. In this embodiment, the cushion paths 340 are openings defined by the valve plate 338. As shown in FIGS. 5B and 5C, a housing 318 defines a vent 346. FIG. 5A shows the fluid diverters 336 in a first position, with each of the fluid diverters 336 rolled up upon itself. FIG. 5B similarly shows one of the fluid diverters 336 of FIG. 5A in the first position. Inflation fluid travels from an inflator nozzle 332 to unroll the fluid diverters 336, thereby moving them to a second position as shown in FIG. 5C, wherein the fluid diverters 336 at least partially block the cushion paths 340. As also shown in FIG. 5C, a portion of the valve plate 338 may also move in response to inflation fluid, thereby blocking space between the valve plate 338 and the housing 318.

As with previous embodiments, when the fluid diverters 336 are in the first position, the internal valve 334 is in an open condition. When the fluid diverters 336 unroll to the second position, the cushion paths 340 become at least partially blocked by the fluid diverters 336 as shown in FIG. 4C, thereby changing the internal valve 334 to a closed condition. When the internal valve 334 is in the open condition, more inflation fluid is directed into the cushion through the cushion paths 340 than when the internal valve 334 is in the closed condition. Likewise, since the fluid diverters 336 at least partially block the cushion paths 340 when in the second position, more fluid will pass through the vent 346, when the internal valve 334 is in the closed condition (assuming the vent 346 is unblocked).

Figure 6:
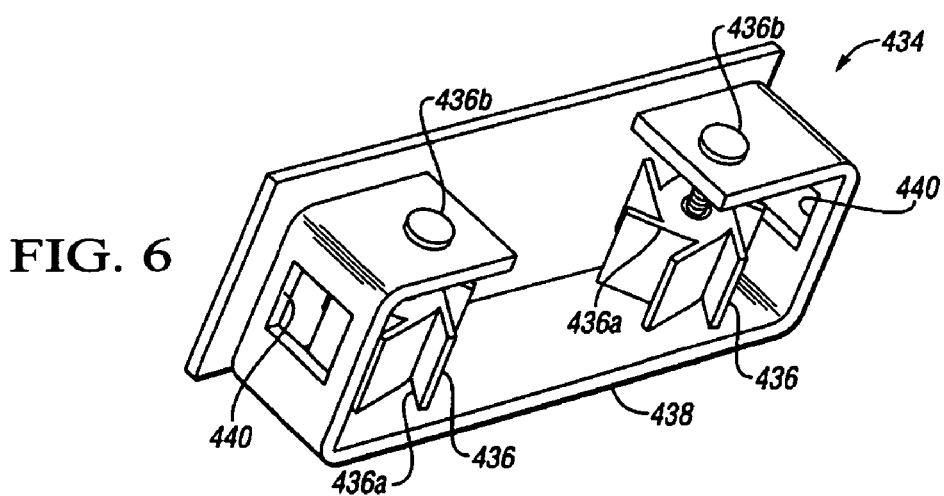
FIG. 6 is a schematic perspective view of a fifth embodiment of an internal valve according to the present invention.

FIG. 6 shows a fifth embodiment of an internal valve 434 according to the present invention. Particularly, a pair of fluid diverters 436 each include a vaned spool 436a disposed on a threaded shaft 436b, with the threaded shafts 436b preferably extending though a valve plate 438. The valve plate 438 defines cushion paths 440 in fluid communication with the cushion 16 of FIG. 1A. The fluid diverters 436 are shown in a first position, wherein the vaned spools 436a do not block the cushion paths 440. Inflation fluid impinges upon the vaned spools 436a, thereby causing the vaned spools 436a to travel along the threaded shafts 436b until the fluid diverters 436 reach a second position (not shown), wherein the vaned spools 436a at least partially block the cushion paths 440. When the fluid diverters 436 are in the first position, the internal valve 434 is in an open condition. When the fluid diverters 436 are in the second position, the internal valve 434 is in a closed condition. When the internal valve 434 is in the open condition, more inflation fluid is directed into the cushion through the cushion paths 440 than when the internal valve 434 is in the closed condition. Likewise, since the fluid diverters 436 at least partially block the cushion paths 440 when in the second position, more fluid will pass through an open vent (not shown) in a housing (not shown) when the internal valve 434 is in a closed condition.

Figure 7A:
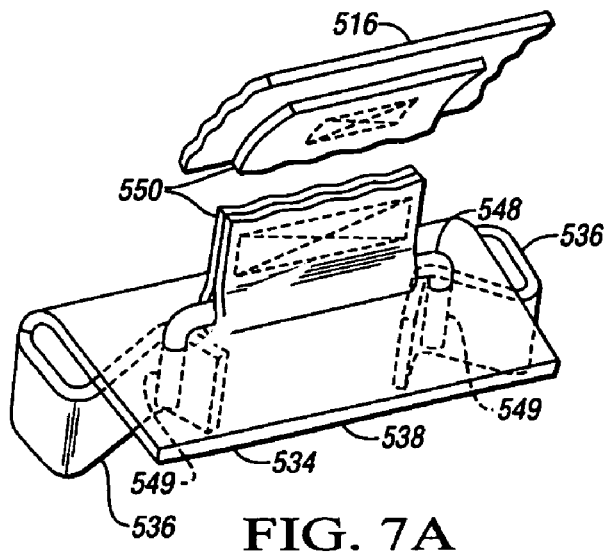
FIG. 7A is a schematic perspective view of a sixth embodiment of an internal valve according to the present invention, with a retention member in a locking position.
Figure 7B:
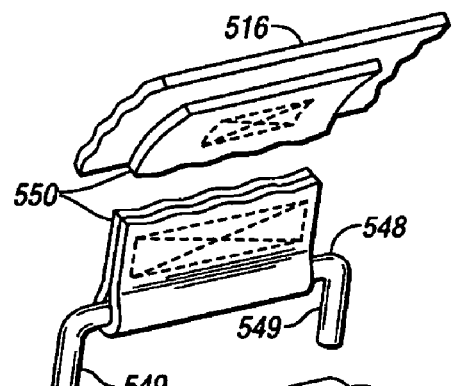
FIG. 7B is a schematic perspective view of the internal valve of FIG. 7A, with the retention member in an unlocking position.

FIGS. 7A and 7B show a sixth embodiment of an internal valve 534 according to the present invention, with a pair of fluid diverters 536 hingedly attached to a valve plate 538. The fluid diverters 536 are movable between a first position, shown in FIG. 7A, and a second position, shown in FIG. 7B, as described with respect to previous embodiments. However, a retention member 548 includes prongs 549 which interfere with the fluid diverters 536 to prevent movement thereof when the retention member 548 is in a locking position, as shown in FIG. 7A. A tether 550 preferably extends between the retention member 548 and an inflatable cushion 516. As the cushion 516 inflates, the tether 550 becomes taut. The length of the tether 550 is designed such that if the cushion 516 passes a predetermined distance during inflation thereof, the tether 550 will pull the retention member 548 away from the internal valve 534 to an unlocking position as shown in FIG. 7B. When the retention member 548 is in the unlocking position, the prongs 549 do not impede movement of the fluid diverters 536, such that the fluid diverters 536 are free to move from the first position to the second position when impinged upon by inflation fluid, or in some other manner. The retention member 548 is preferably grounded, i.e., tethered to another location within the air bag system 14 of FIG. 1A, such that motion of the retention member 548 in the unlocking position is controlled. For example, the retention member 548 may additionally attach to the air bag housing 18 of FIG. 1A, to the cushion 516, or to any other portion of the air bag system, with the additional attachment grounding the retention member 548 therewithin. Grounding the retention member 548 within the air bag system prevents uncontrolled motion thereof, which could lead to puncture of the cushion 516 or impact with a portion of the vehicle. It should also be noted that tether 550 could extend between the retention member 548 and a deployment door (not shown in this embodiment), with movement of the deployment door from a closed position to an open position pulling the retention member 548 to the unlocking position, without changing the inventive concept.

Figure 8:
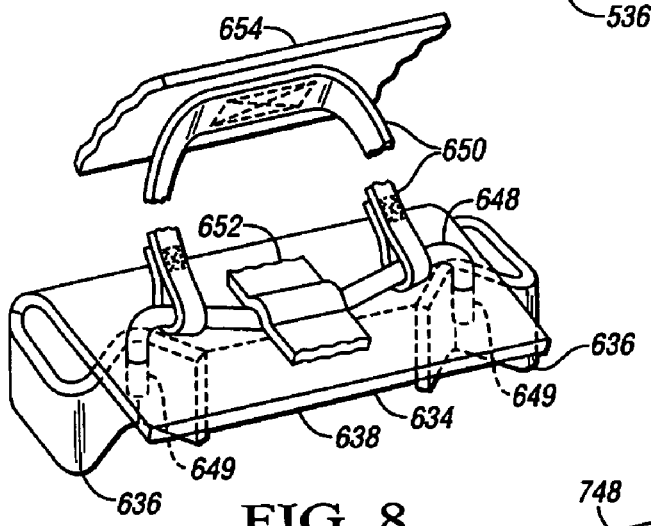
FIG. 8 is a schematic perspective view of a seventh embodiment of an internal valve according to the present invention.

FIG. 8 shows a seventh embodiment of an internal valve 634, including a pair of fluid diverters 636 hingedly attached to a valve plate 638. The fluid diverters 636 are movable from a first position, shown in FIG. 8, to a second position as described with respect to other embodiments. A retention member 648 includes prongs 649 which interfere with the fluid diverters 636 to prevent movement thereof when the retention member 648 is in a locking position, as shown in FIG. 8. An attachment member 652 secures the retention member 648 to the valve plate 638. The attachment member 652 can be a separate member, as shown in FIG. 8, or can be formed integrally with the retention member 648 or the valve plate 638. A tether 650 extends between the retention member 648 and a deployment door 654. The tether 650 may pass through an inflatable cushion such as the cushion 16 of FIG. 1A, or it may be intermediately attached to the cushion between the retention member 648 and the deployment door 654. Preferably, the tether 650 attaches to the retention member 648 in at least one location on either side of the attachment member 652. The deployment door 654 covers a cavity within which the air bag system 14 of FIG. 1A sits, with the deployment door 654 opening prior to or due to inflation of the cushion, as known in the art. As with the previously described embodiment, the tether 650 may extend between the retention member 648 and the cushion 16 of FIG. 1A, with inflation of the cushion effecting movement of the retention member 648 from the locking position to the unlocking position, without changing the inventive concept.

As the deployment door 654 opens, the tether 650 becomes taut, thereby pulling the retention member 648. Since the attachment member 652 secures the retention member 648 to the valve plate 638, the retention member 648 bends away from the internal valve 634 to an unlocking position (not shown), wherein the prongs 649 no longer interfere with movement of the fluid diverters 636, in response to being pulled by the tether 650. In the unlocking position, the retention member 648 remains secured to the valve plate 638, but does not interfere with movement of the fluid diverters 636. The retention member 648 may bend far enough such that the tether 650 releases therefrom, i.e., slides thereoff, such that the tether 650 does not impede inflation of the cushion.

Figure 9:
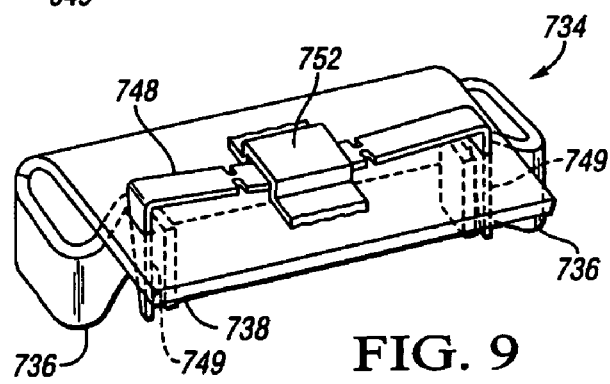
FIG. 9 is a schematic perspective view of an eighth embodiment of an internal valve according to the present invention.

FIG. 9 shows an eighth embodiment of an internal valve 734, including a pair of fluid diverters 736 hingedly attached to a valve plate 738. The fluid diverters 736 are movable from a first position, shown in FIG. 9, to a second position as described with respect to other embodiments. A retention member 748 includes preferably tapered prongs 749 which interfere with the fluid diverters 736 to hinder movement thereof when the retention member 748 is in a locking position, as shown in FIG. 9. An attachment member 752 secures the retention member 748 to the valve plate 738. In this embodiment, the prongs 749 have a tapered or wedge shape, such that movement of the fluid diverters 736 into the prongs 749 push the prongs 749 upward, thereby moving the retention member 748 toward an unlocking position, in response to inflation fluid impingement thereupon. Alternatively, the valve plate 738 may have openings (not shown) which enable some inflator gas to pass through and impinge on the retention member to lift it from a locking position to an unlocking position.

It is possible that the retention member 748 will be blocked from reaching the unlocking position by a portion of air bag system, such as a deployment door as known in the art (a portion of which is shown in FIG. 8). If this is the case, the prongs 749 will continue to engage the fluid diverters 736 until the deployment door has opened. As such, closure of the internal valve 734 may be delayed until the deployment door has partially opened and a cushion of the air bag system has at partially deployed. In this embodiment, no tether is necessary; inflation fluid release triggers movement of the retention member 748 from the locking position to the unlocking position once enough space is created for the prongs 749 to move upward so that they disengage from the fluid diverters 736. Movement of the retention member 748 from the locking position to the unlocking position can also cause the retention member 748 to push on the deployment door, thereby assisting in movement of the deployment door to an open position.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. An air bag system comprising:
   an inflator operable to release inflation fluid;
   an inflatable cushion, said cushion being inflatable upon release of inflation fluid from said inflator;
   an air bag housing substantially surrounding said cushion, said housing having a blockable vent for venting inflation fluid released by said inflator; and
   an internal valve in said airbag housing in fluid communication with said inflator, said internal valve including a fluid diverter movable between a first position and a second position; and
   wherein said blockable vent is configured to not be blockable by said fluid diverter; and
   wherein fluid flow into said cushion decreases and fluid flow through said blockable vent increases when said fluid diverter is in one of said first position and said second position.

2. The air bag system of claim 1, wherein said internal valve further includes a valve plate, said fluid diverter being hingedly attached to said valve plate for movement between said first and second positions.

3. The air bag system of claim 1, wherein said internal valve further includes a deformable extension to slow down movement from said first position to said second position.

4. The air bag system of claim 1, wherein said fluid diverter is a coil rolled upon itself when in said first position, and wherein said fluid diverter unrolls to move from said first position to said second position.

5. The air bag system of claim 1, wherein said fluid diverter is accordion shaped, and wherein said fluid diverter compresses to move from said first position to said second position.

6. The air bag system of claim 1, wherein said fluid diverter is a vaned spool movable along a threaded shaft between said first and second positions.

7. The air bag system of claim 1, wherein said inflation fluid moves said fluid diverter from said first position to said second position.

8. The air bag system of claim 1, further comprising:
   a retention member movable from a locking position to an unlocking position, said retention member preventing movement of said fluid diverter when in said locking position.

9. The air bag system of claim 8, further comprising:
   a deployment door;
   a tether extending between said retention member and said deployment door, such that said tether pulls said retention member from said locking position to said unlocking position when said deployment door opens.

10. The air bag system of claim 8, further including a tether extending between said retention member and said cushion, such that inflation of said cushion beyond a predetermined distance pulls said retention member from said locking position to said unlocking position.

11. The air bag system of claim 8, wherein said retention member is grounded with respect to said air bag system, such that motion of said retention member in said unlocking position is controlled.

12. The air bag system of claim 8, wherein said retention member operatively attaches to said internal valve at at least one location, and wherein said retention member bends with respect to said internal valve at said at least one location to move from said locking position to said unlocking position.

13. The air bag system of claim 8, wherein said fluid diverter is operable to move said retention member from said locking position to said unlocking position.

14. The air bag system of claim 1, wherein fluid is forced past said fluid diverter into said cushion when said blockable vent is blocked.

15. The air bag system of claim 14, further including a vent blocker movable from a first position, wherein said vent blocker leaves said blockable vent substantially unblocked, to a second position, wherein said vent blocker at least partially covers said blockable vent to at least partially block said vent.

16. An air bag system comprising:
   an inflator operable to release inflation fluid;
   an inflatable cushion, said cushion being inflatable upon release of inflation fluid from said inflator;
   an air bag housing substantially surrounding said air bag, said airbag housing having a blockable vent for venting inflation fluid released by said inflator;
   an internal valve in said airbag housing in fluid communication with said inflator, said internal valve including a fluid diverter movable between a first position and a second position, with fluid flow into said cushion decreasing and fluid flow through said blockable vent increasing as said fluid diverter moves from said first position to said second position;
   wherein said blockable vent is configured to not be blockable by said fluid diverter; and
   a retention member movable between a locking position and an unlocking position, said retention member preventing movement of said fluid diverter when in said locking position.

17. An air bag system comprising:
   an inflator operable to release inflation fluid;
   an inflatable cushion, said cushion being inflatable upon release of inflation fluid from said inflator;
   an air bag housing disposed within a cavity and substantially surrounding said cushion, said airbag housing having a blockable vent for venting inflation fluid released by said inflator;
   said cavity defined by a vehicle component;
   a deployment door at least partially covering said cavity;
   an internal valve in said airbag housing in fluid communication with said inflator, said internal valve including a fluid diverter movable between a first position and a second position, with fluid flow into said cushion decreasing and fluid flow through said blockable vent increasing as said fluid diverter moves from said first position to said second position;
   wherein said blockable vent is configured to not be blockable by said fluid diverter; and
   a retention member movable between a locking position and an unlocking position, said retention member preventing movement of said fluid diverter when in said locking position;
   wherein at least one of said cushion and said deployment door moves said retention member from said locking position to said unlocking position.

18. The air bag system of claim 17, wherein said deployment door moves between a closed position and an open position, and wherein said deployment door prevents movement of said retention member when in said closed position.

19. The air bag system of claim 18, wherein said retention member impacts said deployment door during movement from said locking position to said unlocking position, thereby assisting said deployment door in movement from said closed position to said open position.

20. The air bag system of claim 17, wherein said at least one of said cushion and said deployment door is attached to said retention member when said retention member is in said locking position, and wherein said at least one of said cushion and said deployment door is detached from said retention member when said retention member is in said unlocking position.

* * * * *